United States Patent
Shin

(10) Patent No.: US 11,749,830 B2
(45) Date of Patent: Sep. 5, 2023

(54) SYSTEM AND METHOD FOR MANUFACTURING SECONDARY BATTERY

(71) Applicant: LG CHEM, LTD., Seoul (KR)

(72) Inventor: Hyun Seung Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/612,205

(22) PCT Filed: May 30, 2018

(86) PCT No.: PCT/KR2018/006173
§ 371 (c)(1),
(2) Date: Nov. 8, 2019

(87) PCT Pub. No.: WO2019/132137
PCT Pub. Date: Jul. 4, 2019

(65) Prior Publication Data
US 2021/0143466 A1 May 13, 2021

(30) Foreign Application Priority Data

Dec. 26, 2017 (KR) .................. 10-2017-0179347

(51) Int. Cl.
*H01M 10/04* (2006.01)
*H01M 50/536* (2021.01)
(Continued)

(52) U.S. Cl.
CPC ....... *H01M 10/049* (2013.01); *H01M 50/105* (2021.01); *H01M 50/536* (2021.01); *H01M 50/636* (2021.01)

(58) Field of Classification Search
CPC .. H01M 10/049; H01M 50/54; H01M 50/636; H01M 50/536; H01M 10/0472;
(Continued)

(56) References Cited

U.S. PATENT DOCUMENTS 5,129,643 A * 7/1992 Johnson ............ H01M 10/0404
271/151
9,099,691 B2 8/2015 Hwang et al.
(Continued)

FOREIGN PATENT DOCUMENTS

CN 101409361 A 4/2009
CN 104638304 A 5/2015
(Continued)

OTHER PUBLICATIONS

Extended European Search Report for European Application No. 18896576.8, dated May 25, 2020.
(Continued)

*Primary Examiner* — Niki Bakhtiari
*Assistant Examiner* — Bartholomew A Hornsby
(74) *Attorney, Agent, or Firm* — Birch, Stewart, Kolasch & Birch, LLP

(57) ABSTRACT

Provided is a system for manufacturing a secondary battery including: a positive electrode cell manufacturing line having a positive electrode single cell, on which a positive electrode tab is processed on one end of a positive electrode and a first separator is combined on one surface of the positive electrode, is continuously manufactured; a negative electrode cell manufacturing line having a negative electrode single cell, on which a negative electrode tab is processed on one end of a negative electrode and a second separator is combined on one surface of the negative electrode, is continuously manufactured; and a stacking part alternately receiving positive electrode single cells and negative electrode single cells respectively from the positive electrode cell manufacturing line and the negative electrode cell manufacturing line to stack the positive electrode single cells and the negative electrode single cells up to a predetermined layer, thereby forming a stack cell.

12 Claims, 7 Drawing Sheets

(51) Int. Cl.
*H01M 50/636* (2021.01)
*H01M 50/105* (2021.01)

(58) Field of Classification Search
CPC ......... H01M 10/0413; H01M 10/0404; H01M 10/0585; H01M 10/0436; Y02P 70/50
See application file for complete search history.

(56) References Cited

U.S. PATENT DOCUMENTS

| | | |
|---|---|---|
| 2009/0197162 A1 | 8/2009 | Shinyashiki et al. |
| 2011/0076392 A1 | 3/2011 | Issaev et al. |
| 2011/0123857 A1 | 5/2011 | Hwang et al. |
| 2011/0129722 A1 | 6/2011 | Yoneda |
| 2011/0244287 A1 | 10/2011 | Kim et al. |
| 2011/0244312 A1 | 10/2011 | Tani et al. |
| 2012/0148913 A1* | 6/2012 | Chiba ............... H01M 50/103 29/730 |
| 2013/0196193 A1 | 8/2013 | Okamoto et al. |
| 2013/0224602 A1 | 8/2013 | Huang |
| 2013/0240323 A1* | 9/2013 | Min ............... H01M 10/0404 198/340 |
| 2013/0295436 A1 | 11/2013 | Kwon et al. |
| 2014/0082930 A1 | 3/2014 | Bouvier |
| 2014/0182118 A1 | 7/2014 | Kim et al. |
| 2014/0186671 A1 | 7/2014 | Kim et al. |
| 2014/0199581 A1* | 7/2014 | Ryu ............... H01M 50/54 429/161 |
| 2015/0086317 A1* | 3/2015 | Yamaura ............ H01M 10/0404 414/789.5 |
| 2015/0380706 A1 | 12/2015 | Yu et al. |
| 2016/0111729 A1 | 4/2016 | Kim et al. |
| 2016/0359202 A1 | 12/2016 | Jeon et al. |
| 2017/0062867 A1 | 3/2017 | Kim et al. |
| 2017/0331164 A1 | 11/2017 | Kwon |
| 2019/0067752 A1 | 2/2019 | Jeon et al. |

FOREIGN PATENT DOCUMENTS

| | | | |
|---|---|---|---|
| EP | 2 328 199 A2 | 6/2011 | |
| EP | 2328199 A2 * | 6/2011 | ........ H01M 10/0413 |
| JP | 2014-107237 A | 6/2014 | |
| JP | 2014-127273 A | 7/2014 | |
| KR | 10-2003-0019996 A | 3/2003 | |
| KR | 10-2010-0061317 A | 6/2010 | |
| KR | 10-2011-0058658 A | 6/2011 | |
| KR | 10-2014-0026489 A | 3/2014 | |
| KR | 10-2014-0091441 A | 7/2014 | |
| KR | 10-2014-0143660 A | 12/2014 | |
| KR | 10-2015-0113479 A | 10/2015 | |
| KR | 10-2016-0098148 A | 8/2016 | |
| KR | 10-2016-0142654 A | 12/2016 | |
| KR | 10-2017-0026769 A | 3/2017 | |
| KR | 10-2017-0028288 A | 3/2017 | |
| KR | 10-2017-0127273 A | 11/2017 | |

OTHER PUBLICATIONS

International Search Report issued in PCT/KR2018/006173 (PCT/ISA/210), dated Sep. 27, 2018.

* cited by examiner

SYSTEM AND METHOD FOR MANUFACTURING SECONDARY BATTERY

CROSS-REFERENCE TO RELATED APPLICATION

The present application claims the benefit of the priority of Korean Patent Application No. 10-2017-0179347, filed on Dec. 26, 2017, which is hereby incorporated by reference in its entirety.

TECHNICAL FIELD

The present invention relates to a system and method for manufacturing a secondary battery, and more particularly, to a system and method for manufacturing a secondary battery, in which the secondary battery is manufactured in a continuous process from processing to packaging of an electrode base material (a positive electrode base material and a negative electrode base material).

BACKGROUND ART

The demand for secondary batteries as energy sources is rapidly increasing in various fields comprising personal portable terminal and electric vehicle fields.

Unlike primary batteries, rechargeable secondary batteries are being developed not only for digital devices but also for vehicles such as electric vehicles.

Secondary batteries are variously classified according to materials and external shapes of a positive electrode and a negative electrode. Among them, since such a lithium secondary battery using a lithium compound material has a large capacity and a low self-discharge rate, the lithium secondary battery is being widely used as power sources of various electrical devices instead of a nickel-cadmium secondary battery of a related art.

Also, the lithium secondary battery may be manufactured in various shapes. Representatively, the lithium secondary battery may be classified into a cylinder type secondary battery, a prismatic type secondary battery, and a pouch type secondary battery. Here, an electrode assembly for charging and discharging electric energy is built in a case. The electrode assembly has a structure in which a negative electrode, a separator, and a positive electrode are stacked and is built together with an electrolyte in the case (the pouch or cylinder type case or the like).

Each of the positive electrode, the negative electrode, and the separator is made of a material selected in consideration of a battery lifespan, a charging/discharging capacity, a temperature characteristic, safety, and the like. A process in which lithium ions are intercalated and deintercalated into/from the negative electrode from lithium metal oxide of the positive electrode is repeatedly performed to charge/discharge the lithium secondary battery.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly.

The electrode assembly may be manufactured to be classified into, representatively, a winding type (jelly-roll type), a stacking type (stack type), a stack and folding type. Electrode slurry containing an electrode active material is applied to a surface of a collector made of metal foil, and dried and pressed, and then, the collector is cut to have a desired width and length to manufacture a positive electrode and a negative electrode. Then, a separator is stacked between the positive electrode and the negative electrode, and the stack is spirally wound to the winding type electrode assembly. The winding type electrode assembly has a cylindrical shape and thus is mounted on the cylinder type secondary battery. Also, the stack type electrode assembly has a structure in which a negative electrode, a separator, and a positive electrode are cut to a proper size and then successively stacked. Typically, the stack type electrode assembly is mounted on the pouch type secondary battery.

The stack and folding type electrode assembly has a structure in which the structure of the winding type electrode assembly and the structure of the stack type electrode assembly are mixed with each other. That is, each of the unit cells b is provided as a full cell having a predetermined unit size and a structure of a positive electrode/a separator/a negative electrode or a bicell having a predetermined unit size and a structure of a negative (positive) electrode/a separator/a positive (negative) electrode/a separator/a negative (positive) electrode. As illustrated in FIG. 1, the unit cells b are placed on a folding separator and then continuously folded.

A process of manufacturing the stack and folding type electrode assembly has the following disadvantages in term of quality and productivity. First, in the case in which defects occur when the unit cells b provided as the full cells or the bicells are manufactured or when the unit cells b are seated on the folding separator a, the entire electrode assembly manufactured by folding the folding separator a may occur to increase in waste loss. Also, it may be difficult to grasp positions of the unit cells b disposed at the center and whether the unit cells b are folded when the folding separator is folded. Thus, there may be a possibility of occurrence of defects. In addition, when the unit cells b are seated on the folding separator a, the completed electrode separator may be twisted by an initial minute error. In addition, since the unit cells b are seated on the electrode separator a after being transferred in the semi-finished product state, the process may be delayed in the transfer process. In the case in which the unit cells are provided as the bicells, there may be a disadvantage in terms of inventory management because matching of the bicells are required.

DISCLOSURE OF THE INVENTION

Technical Problem

An object of the present invention is to provide a system for manufacturing a secondary battery, which has a stack type structure and is capable of solving the above-described problems through a continuous process from processing to packaging of an electrode base material in a production system for the secondary battery, and a method for manufacturing the secondary battery.

Technical Solution

To achieve the above-described object, the present invention provides a system for manufacturing a secondary battery, which comprises: a positive electrode cell manufacturing line in which a positive electrode single cell, on which a positive electrode tab is processed on one end of a positive electrode and a first separator is combined on one surface of the positive electrode, is continuously manufactured; a negative electrode cell manufacturing line in which a negative electrode single cell, on which a negative electrode tab is processed on one end of a negative electrode and a second separator is combined on one surface of the negative electrode, is continuously manufactured; and a stacking part alternately receiving positive electrode single cells and negative electrode single cells respectively from the positive electrode cell manufacturing line and the negative electrode cell manufacturing line to stack the positive electrode single cells and the negative electrode single cells up to a predetermined layer, thereby forming a stack cell.

Also, the system may further include: a welding part in which a primary welding is performed so that negative electrode tabs of the stack cell transferred from the stacking part are connected to each other to form one tab, and positive electrode tabs of the stack cell transferred from the stacking part are connected to each other to form one tab; and a packaging part in which the stack cell transferred from the welding part is put into a pouch, and the pouch is partially sealed, wherein the positive electrode cell manufacturing line and the negative electrode cell manufacturing line are connected in parallel to each other, and the stacking part, the welding part, and the packaging part are successively connected in series to perform continuous processing.

The stacking part may be disposed at a center between a terminal portion of the positive electrode cell manufacturing line and a terminal portion of the negative electrode cell manufacturing line to alternately rotate toward the terminal portion of the positive electrode cell manufacturing line and the terminal portion of the negative electrode cell, thereby alternatively receiving the positive electrode single cell and the negative electrode single cell. For example, since the system includes a turn table that is capable of rotating in both directions, the positive electrode single cell and the negative electrode single cell may be successively stacked on a rotating position of the turn table.

The stack cell may have a structure in which the first separator, the positive electrode, the second separator, and the negative electrode are successively stacked, wherein another separator may be disposed on the lowermost end, and the positive electrode may be disposed on the uppermost end.

The stacking part may include an aligner that is capable of determining a stacking position and adjusting the stacking position when the negative electrode single cell and the positive electrode single cell are alternately stacked.

The aligner may optically recognize a shape of each of the negative electrode single cell and the positive electrode single cell, which are stacked, to calculate an error relative to a proper position at which the stacking is performed.

Also, a secondary welding is performed in the welding part so that the negative electrode tabs connected to each other to form one tab and the positive electrode tabs connected to each other to form one tab are respectively additionally connected to a negative electrode lead and a positive electrode lead. The welding part may be provided as a conveyor that moves the stack cell from the stacking part to the packaging part.

A positive electrode base material and a negative electrode base material, which are respectively put into the positive electrode cell manufacturing line and the negative electrode cell manufacturing line, may be put in a dried state.

In the positive electrode cell manufacturing line and the negative electrode cell manufacturing line, notching processing for molding ends of the positive electrode base material and the negative electrode to form the tabs; cutting processing for cutting the positive electrode base material and the negative electrode base material to a predetermined size to form the positive electrode and the negative electrode; and a combining process of combining the separator on one surface of each of the cut positive and negative electrodes may be performed.

The system may further include an injected liquid sealing part connected to in series to the packaging part, wherein, in the injected liquid sealing part, an electrolyte may be injected into the pouch, and the remaining portion of the pouch may be sealed.

A method for manufacturing a secondary battery according to the present invention includes: alternatively providing a positive electrode single cell, on which a positive electrode tab is processed on one end of a positive electrode and a first separator is combined on one surface of the positive electrode, and a negative electrode single cell, on which a negative electrode tab is processed on one end of a negative electrode and a second separator is combined on one surface of the negative electrode; alternatively stacking the positive electrode single cell and the negative electrode single cell up to a predetermined layer to form a stack cell; connecting the negative electrode tabs of the stack cell to each other to form one tab, connecting the positive electrode tabs of the stack cell to each other to form one tab, and welding each of the tabs to a lead; and putting the stack cell into a pouch to partially seal the pouch, wherein the steps are successively connected to perform a continuous processing.

Advantageous Effects

The present invention having the above-described configuration may be realized through the continuous process from the processing to the packaging of the electrode base material to solve the above-described problems according to the related art. That is, the waste loss may be reduced, and the stacked state may be grasped during the stacking of the electrodes. In addition, the step of transferring the semi-finished product state may be removed, and the inventory management may be eased.

MODE FOR CARRYING OUT THE INVENTION

Figure 1:
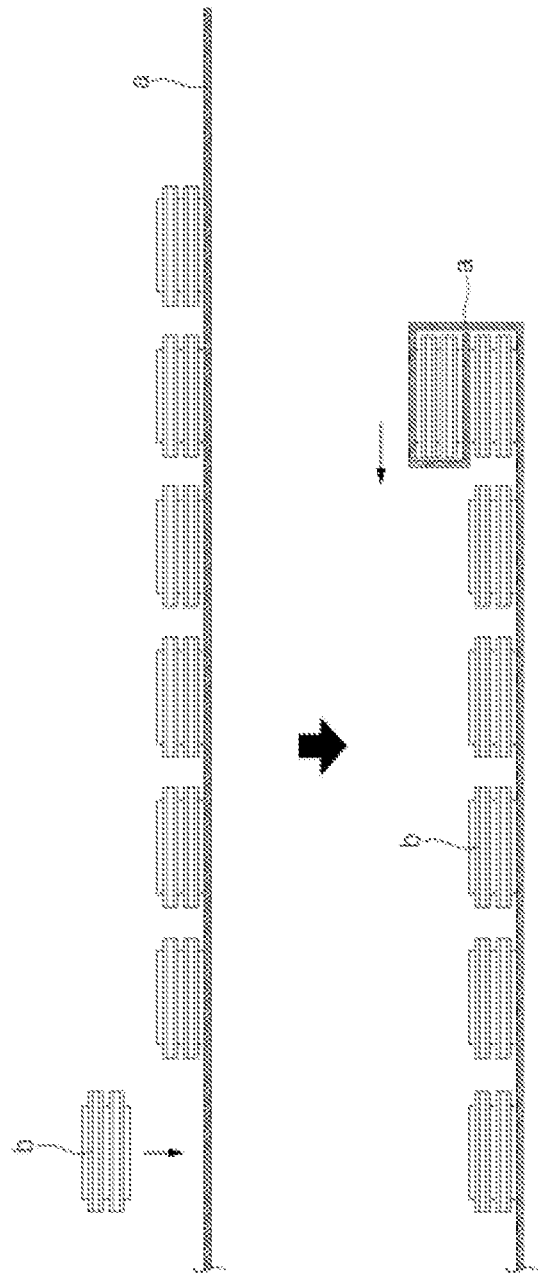
FIG. 1 is a view illustrating a state in which an electrode assembly is manufactured in a stack and folding manner according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a system for manufacturing a secondary battery in which an electrode assembly is built. Hereinafter, embodiments of the present invention will be described in more detail with reference to the accompanying drawings.

Embodiment 1

Figure 2:
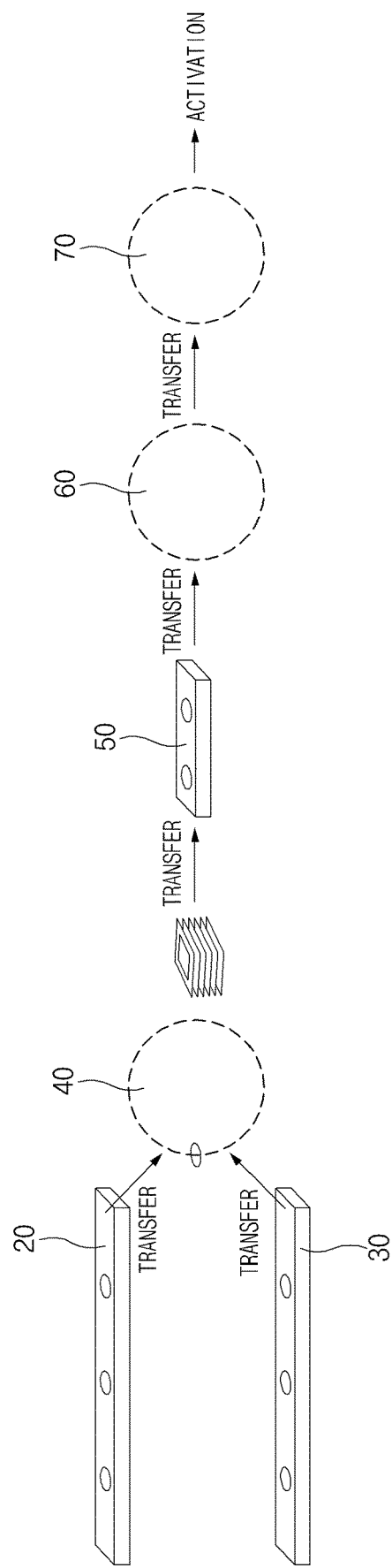
FIG. 2 is a process view illustrating an entire arrangement of a manufacturing system according to the present invention.

FIG. 2 is a process view illustrating an entire arrangement of a manufacturing system according to the present invention. Referring to FIG. 2, in the manufacturing system according to the present invention, a positive electrode cell manufacturing line 20 and a negative electrode cell manufacturing line 30 are disposed in parallel to each other, and then, a stacking part 40, a welding part 50, a packaging part 60, and an injected liquid sealing part 70 are disposed in series so that a continuous process is performed.

In the positive electrode cell manufacturing line 20 and the negative electrode cell manufacturing line 30, electrode base materials (a positive electrode base material and a negative electrode base material, respectively) coated with electrode slurry (positive electrode slurry and negative electrode slurry, respectively) on one surface of each of collectors 3 are continuously put into respective inlet sides to start processing. A positive electrode single cell 1b and a negative electrode single cell 2b, on which tabs 1a and 2a are processed and each of the separators 3 is combined on one surfaces of each of the cells 1b, 2b, are manufactured in a terminal portion of each of the manufacturing lines and then discharged. Here, the positive electrode base material and the negative electrode base material, which are respectively put into the positive electrode cell manufacturing line and the negative electrode cell manufacturing line, are put in a dried state, for example, a vacuum-dried state.

Figure 3:
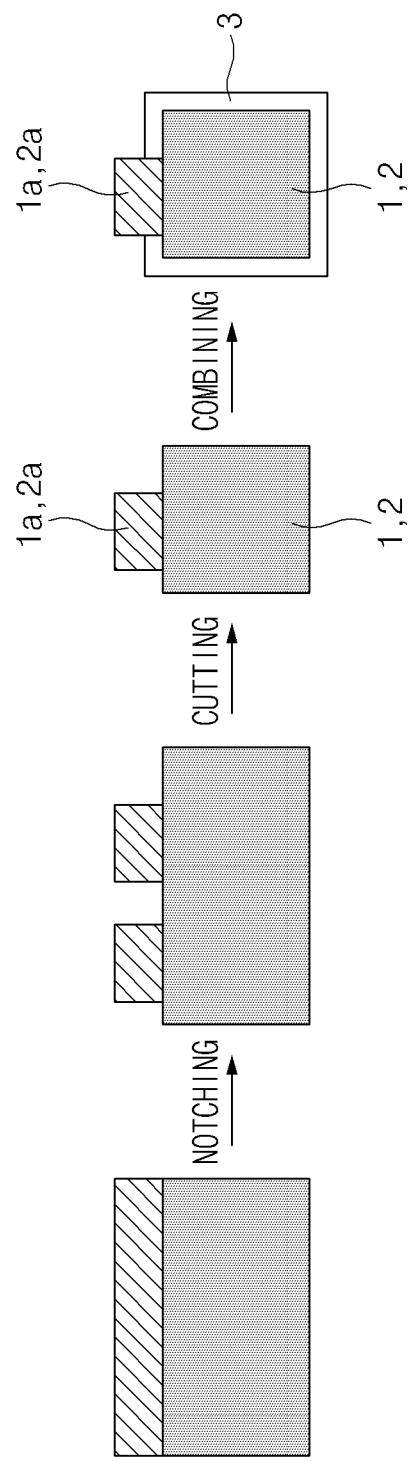
FIG. 3 is a view illustrating a positive electrode single cell or a negative electrode single cell, which is being processed in a positive electrode cell manufacturing line and a negative electrode cell manufacturing line.

That is, as illustrated in FIG. 3, in the positive electrode cell manufacturing line and the negative electrode cell manufacturing line, notching processing for molding ends (portions that are not coated with the electrode slurry on the collector) of the positive electrode base material and the negative electrode base material to form the tabs 1a and 2a, is performed, and then, a processing process of cutting each of the positive electrode base material and the negative electrode base material to a predetermined size and a combining process of combining the separator 3 on one surface of each of cut positive and negative electrodes 1 and 2 are performed. That is, the positive electrode single cell 1b may represent combination of one positive electrode 1 and one separator 3, and the negative electrode single cell 2b may represent combination of one negative electrode 2 and one separator 3.

Figure 4:
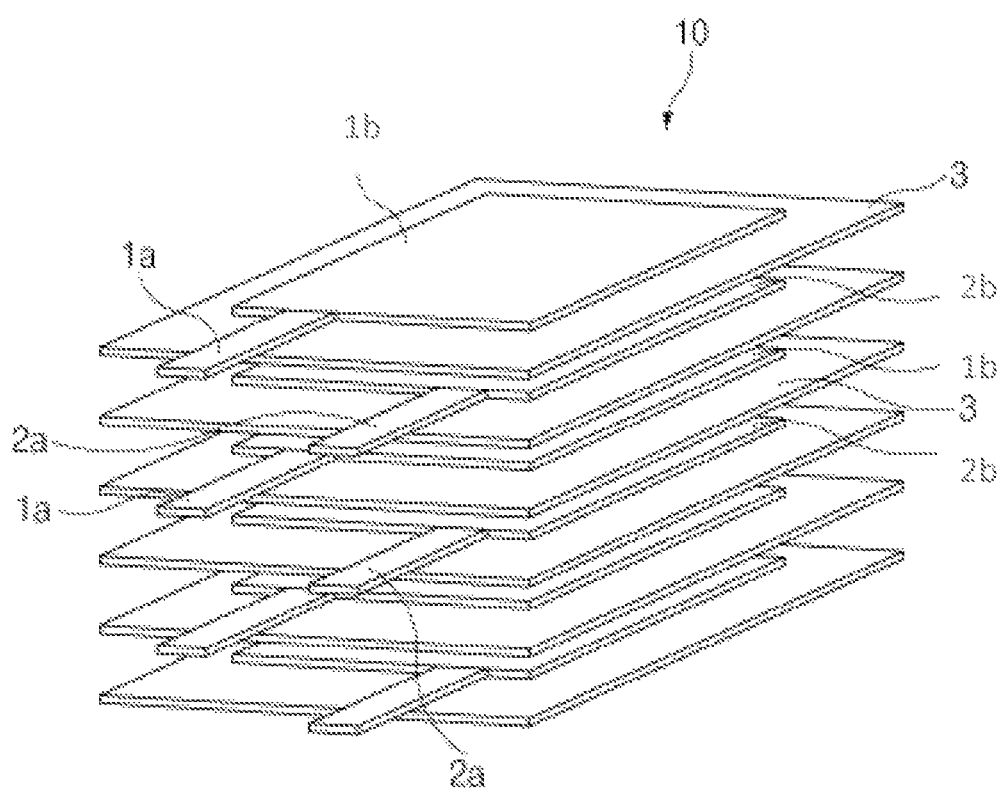
FIG. 4 is a perspective view illustrating a stack cell in which the positive electrode single cells and the negative electrode single cells are alternately stacked in a stacking part.

The positive electrode single cells 1b and the negative electrode single cells 1b, which are respectively manufactured in the positive electrode cell manufacturing line 20 and the negative electrode cell manufacturing line 30, are alternately discharged at a time difference or at different times from each other. Thus, the positive electrode single cells 1b and the negative electrode single cells 2b may be alternately transferred to the staking part 40 disposed at terminals portions of the positive electrode cell manufacturing line and the negative electrode cell manufacturing line and then stacked up to a predetermined layer to manufacture the stack cell 10 as illustrated in FIG. 4. Here, according to the present invention, the stack cell 10 has a structure in which the separator 3, the positive electrode 1, the separator 3, and the negative electrode 2 are successively stacked. The separator 3 is disposed at the lowermost end, and the positive electrode 1 is disposed at the uppermost end.

The stacking part 40 may comprise a device such as a turn table that is rotatable in both directions. The turn table is configured to be rotatable in both directions by electricity, hydraulic pressure, pneumatic pressure, or the like. The turn table may be disposed at a center between the terminal portions of the positive electrode cell manufacturing line 20 and the negative electrode cell manufacturing line 30 to alternately rotate, thereby alternately receiving the positive electrode single cells 1b and the negative electrode single cells 1b. Thus, the positive electrode single cells 1b and the negative electrode single cells 2b may be successively stacked on the turn table.

Furthermore, the stacking part 40 may comprise a correction aligner that is capable of determining a stacking position and adjusting the stacking position when the negative electrode single cell and the positive electrode single cell are alternately stacked on the turn table.

A commercially available device may be used as the aligner. The aligner is configured to optically recognize a shape of each of the negative electrode single cell and the positive electrode single cell, which are stacked, calculate an error with or relative to a proper position at which the stacking is performed, and transmit and receive data to/from a rotation control device of the turn table, thereby correcting the rotation position in real time.

Alternatively, the aligner may be manufactured to grasp the stacked state through other known measuring methods, not only the optical sensing of the negative electrode single cell and the positive electrode single cell.

The stack cell 10 manufactured in the stacking part 40 is transferred to the welding part 50. In this embodiment, the welding part 50 is provided as a conveyor that moves the stack cell 10 from the stacking part to the packaging part 60. A primary welding and a secondary welding are successively performed on the welding part 50.

Figure 5A:
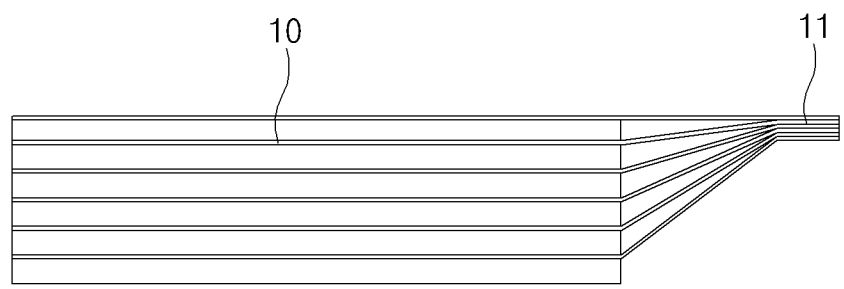
FIG. 5A is a side view illustrating a state in which primary welding is performed on a welding part.
Figure 5B:
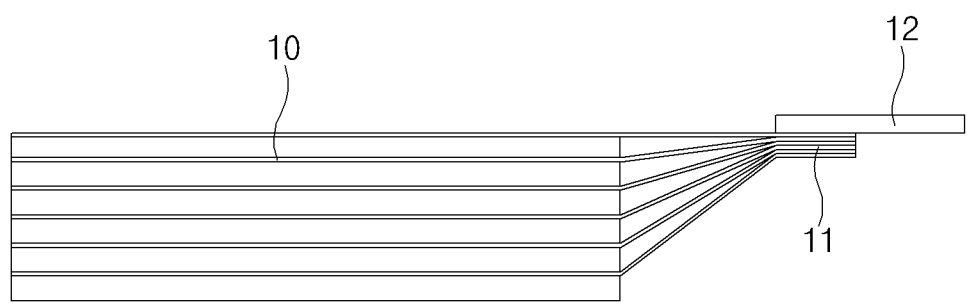
FIG. 5B is a side view illustrating a state in which a secondary welding is performed on the welding part.

As illustrated in FIG. 5A, the primary welding is performed so that the negative electrode tabs of the stack cell 10 transferred from the stacking part 40 may be collected and bonded to each other to form one tab 11, and the positive electrode tabs of the stack cell 10 transferred from the stacking part 40 may be collected and bonded to each other to form one tab 11. As illustrated in FIG. 5B, the secondary welding is performed so that the negative electrode tabs formed as one tab 11 and the positive electrode tabs formed as one tab 11 are respectively connected to leads 12 (a negative electrode lead and a positive electrode lead).

For reference, the primary welding can be performed through ultrasonic welding with less thermal deformation, and the secondary welding can be performed through laser welding that is capable of realizing relatively high welding strength.

Figure 6:
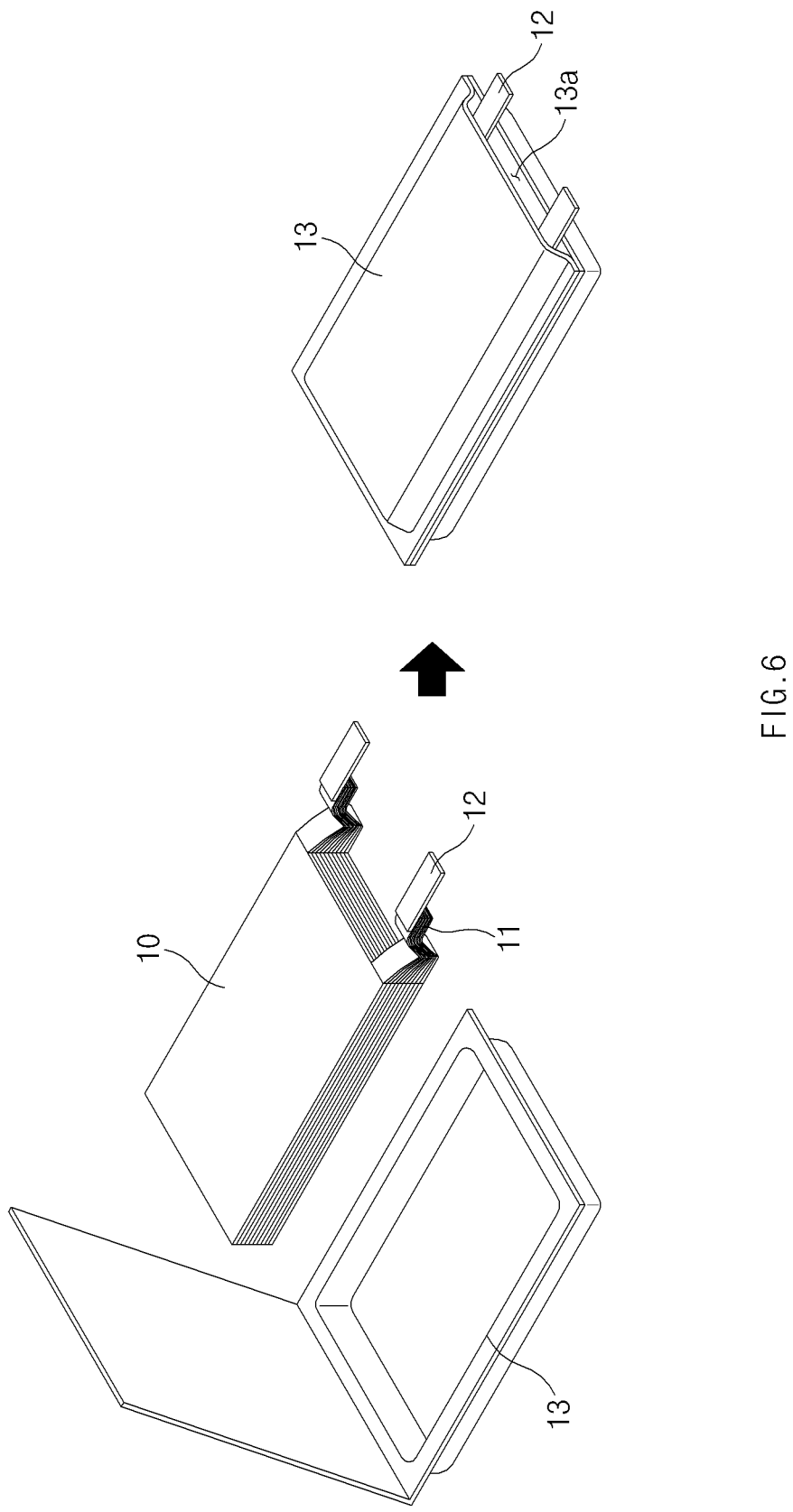
FIG. 6 is a perspective view illustrating a state in which a stack cell is inserted into a pouch, and both sides of the pouch are sealed in a packaging part.

Also, the stack cell 10 passing through the welding part 50 as an electrode assembly to which the leads 12 are bonded is transferred to the packaging part 60 and then built in a pouch 13 in the packing part 60. As illustrated in FIG. 6, the pouch 13 has a structure in which a lower end having a container shape and an upper end having a cover shape are connected to one side and also has a rectangular shape. In the packaging part 60, When the stack cell 10 is built in a state in which the upper end of the pouch 13 is opened, both sides are sealed in a state in which the upper end covers the lower end. Thus, the rest of three sides except for one side (that is opposite to the side at which the upper end and the lower end are connected to each other) are sealed, and an opening 13a is formed in only one side. For reference, the packaging part 60 may also comprise a rotatable turn table like the stacking part 40. While the turn table rotates, the insertion of the stack cell 10, the covering of the upper end, and the sealing of the pouch 13 are successively performed.

In this state, the pouch 13 in which the stack cell 10 is built is transferred to the injected liquid sealing part 70. In the injected liquid sealing part 70, an electrolyte is injected through the opening 13a of the pouch 13. When the injection is completed, the opening 13a is sealed. When the pouch 13 is completely sealed, the pouch 13 is transferred to an activation process in which the charging/discharging is performed.

In the manufacturing system having the above-described constituents according to the present invention, the positive electrode cell manufacturing line 20 and the negative electrode cell manufacturing line 30 are connected parallel to each other, and then, the stacking part 40, the welding part 50, and the packaging part 60 are successively connected in series to each other to perform the continuous processing. Thus, the continuous process from the processing to the packaging of the electrode base material is performed to improve yield and quality in the manufacturing process of the secondary battery and also improve productivity.

That is, the waste loss may be reduced, and the stacked state may be grasped during the stacking of the electrodes. In addition, the step of transferring the semi-finished product state may be removed, and the inventory management may be eased.

Embodiment 2

In the present invention, a method for manufacturing a secondary battery, to which the above-described manufacturing system is applied, can be additionally provided. The manufacturing method according to this embodiment comprises a step of alternately providing a positive electrode single cell, on which a tab 1a is processed on one end of a positive electrode 1, and a separator 3 is combined on one surface of the positive electrode 1, and a negative electrode single cell on which a tab 2a is processed on one end of a negative electrode 2, and a separator is combined on one surface of the negative electrode 2. The step is performed through the positive electrode cell manufacturing line 20 and the negative electrode cell manufacturing line 30.

In addition, a step of alternately stacking the positive electrode single cells and the negative electrode single cells up to a predetermined layer through the stacking part 40 to form a stack cell 10 and a step of connecting the negative electrode tabs to each other to form one tab 11 and connecting the positive electrode tabs to each other to form one tab 11 and welding each of the tabs 11 to a lead 12 through the welding part 50 are performed.

Finally, a step of putting the stack cell 10 into a pouch 13 to partially seal the pouch 13 is performed in the packaging part 60.

Here, the steps are continuously performed because the steps are successively connected to each other.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A system for manufacturing a secondary battery, the system comprising: a positive electrode cell manufacturing line in which a positive electrode single cell, on which a positive electrode tab is processed on one end of a positive electrode and a first separator is combined on one surface of the positive electrode, is continuously manufactured, the positive electrode cell manufacturing line extending in a first direction along a first line; a negative electrode cell manufacturing line in which a negative electrode single cell, on which a negative electrode tab is processed on one end of a negative electrode and a second separator is combined on one surface of the negative electrode, is continuously manufactured, the negative electrode cell manufacturing line extending in the first direction along a second line spaced from and parallel to the first line; and a stacking part comprising a turn table rotatable towards both the first and second lines and configured to alternately receive a plurality of the positive electrode single cells and a plurality of the negative electrode single cells respectively from the positive electrode cell manufacturing line and the negative electrode cell manufacturing line to stack the plurality of the positive electrode single cells and the plurality of the negative electrode single cells up to a predetermined layer, thereby forming a stack cell, wherein the turn table of the stacking part is disposed between the first line of the positive electrode cell manufacturing line and the second line of the negative electrode cell manufacturing line to alternately rotate in both directions toward the terminal portion of the positive electrode cell manufacturing line and the terminal portion of the negative electrode cell manufacturing line, thereby alternately receiving the positive electrode single cell and the negative electrode single cell.

2. The system of claim 1, further comprising: a welding part in which a primary welding is performed so that a plurality of the negative electrode tabs of the stack cell transferred from the stacking part are connected to each other to form one tab, and a plurality of the positive electrode tabs of the stack cell transferred from the stacking part are connected to each other to form one tab; and a packaging part in which the stack cell transferred from the welding part is put into a pouch, and the pouch is partially sealed, wherein the stacking part, the welding part, and the packaging part are successively connected in series to perform a continuous processing.

3. The system of claim 2, wherein the stack cell has a structure in which the first separator, the positive electrode, the second separator, and the negative electrode are successively stacked, wherein another separator is disposed on the lowermost end, and the positive electrode is disposed on the uppermost end.

4. The system of claim 1, wherein the stacking part further comprises an aligner that is capable of determining a stacking position and adjusting the stacking position when the negative electrode single cell and the positive electrode single cell are alternately stacked.

5. The system of claim 4, wherein the aligner optically recognizes a shape of each of the negative electrode single cell and the positive electrode single cell, which are stacked, to calculate an error relative to a proper position at which the stacking is performed.

6. The system of claim 2, wherein a secondary welding is performed in the welding part so that a plurality of the negative electrode tabs connected to each other to form one tab and a plurality of the positive electrode tabs connected to each other to form one tab are respectively additionally connected to a negative electrode lead and a positive electrode lead.

7. The system of claim 6, wherein the welding part is provided as a conveyor that moves the stack cell from the stacking part to the packaging part.

8. The system of claim 1, wherein a positive electrode base material and a negative electrode base material, which are respectively put into the positive electrode cell manufacturing line and the negative electrode cell manufacturing line, are put in a dried state.

9. The system of claim 8, wherein, in the positive electrode cell manufacturing line and the negative electrode cell manufacturing line, performed are:
  notching processing for molding ends of the positive electrode base material and the negative electrode to form the positive and negative tabs;
  cutting processing for cutting the positive electrode base material and the negative electrode base material to a predetermined size to form the positive electrode and the negative electrode; and
  a combining process of combining the separator on one surface of each of the cut positive and negative electrodes.

10. The system of claim 2, further comprising an injected liquid sealing part connected to in series to the packaging part,
  wherein, in the injected liquid sealing part, an electrolyte is injected into the pouch, and the remaining portion of the pouch is sealed.

11. A method for manufacturing a secondary battery, the method comprising operations of:
  alternatively providing a positive electrode single cell on a positive electrode cell manufacturing line extending in a first direction along a first line and a negative electrode single cell on a negative electrode cell manufacturing line extending in the first direction along a second line spaced from and parallel to the first line, the positive electrode single cell being one on which a positive electrode tab is processed on one end of a positive electrode and a first separator is combined on one surface of the positive electrode, and the negative electrode single cell being one on which a negative electrode tab is processed on one end of a negative electrode and a second separator is combined on one surface of the negative electrode;
  alternatively stacking the positive electrode single cell and the negative electrode single cell up to a predetermined layer to form a stack cell at a turn table included in a stacking part;
  connecting a plurality of the negative electrode tabs of the stack cell to each other to form one tab, connecting a plurality of the positive electrode tabs of the stack cell to each other to form one tab, and welding each of the tabs to a lead; and putting the stack cell into a pouch to partially seal the pouch at a packing part, wherein the operations are successively connected to perform a continuous processing, wherein alternatively stacking is performed by the turn table of stacking part, and wherein the stacking part is disposed between the first line of the positive electrode cell manufacturing line and the second line of the negative electrode cell manufacturing line and the turn table of the stacking part is configured to alternately rotate in both directions toward the terminal portion of the positive electrode cell manufacturing line and the terminal portion of the negative electrode cell manufacturing line, thereby alternately receiving the positive electrode single cell and the negative electrode single cell.

12. The system of claim 2, wherein the packaging part includes a rotatable turn table, and
  wherein, as the rotatable turn table rotates, the putting of the stack cell, covering of an upper end of the pouch, and sealing of the pouch are successively performed.

* * * * *